United States Patent
Kaushik et al.

(10) Patent No.: US 11,217,245 B2
(45) Date of Patent: Jan. 4, 2022

(54) CUSTOMIZABLE KEYWORD SPOTTING SYSTEM WITH KEYWORD ADAPTATION

(71) Applicant: Sony Interactive Entertainment Inc., Tokyo (JP)

(72) Inventors: Lakshmish Kaushik, San Mateo, CA (US); Zhenhao Ge, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 305 days.

(21) Appl. No.: 16/555,616

(22) Filed: Aug. 29, 2019

(65) Prior Publication Data

US 2021/0065699 A1    Mar. 4, 2021

(51) Int. Cl.
| | |
|---|---|
| *G10L 15/22* | (2006.01) |
| *G10L 15/02* | (2006.01) |
| *G10L 15/16* | (2006.01) |
| *G10L 15/06* | (2013.01) |
| *G06F 40/242* | (2020.01) |
| *G10L 15/08* | (2006.01) |

(52) U.S. Cl.
CPC ............ *G10L 15/22* (2013.01); *G06F 40/242* (2020.01); *G10L 15/02* (2013.01); *G10L 15/063* (2013.01); *G10L 15/16* (2013.01); *G10L 2015/025* (2013.01); *G10L 2015/088* (2013.01)

(58) Field of Classification Search
CPC ....... G10L 15/22; G10L 15/02; G10L 15/063; G10L 15/16; G10L 2015/025; G10L 2015/088; G06F 40/242
See application file for complete search history.

(56) References Cited

U.S. PATENT DOCUMENTS

| | | |
|---|---|---|
| 6,975,988 B1 | 12/2005 | Roth et al. |
| 9,330,258 B1 | 5/2016 | Satish et al. |
| 9,934,777 B1 | 4/2018 | Joseph et al. |
| 11,004,443 B2 * | 5/2021 | Yu .......................... G10L 15/063 |

(Continued)

FOREIGN PATENT DOCUMENTS

| | | |
|---|---|---|
| CA | 2718564 C | 10/2014 |
| WO | 2019049089 A1 | 3/2019 |

OTHER PUBLICATIONS

International Search Report and Written Opinion dated Jan. 19, 2021 from the counterpart PCT application PCT/US20/47961.

*Primary Examiner* — Michael Colucci
(74) *Attorney, Agent, or Firm* — John L. Rogitz

(57) ABSTRACT

A wake-up word for a digital assistant may be specified by a user to trigger the digital assistant to respond to the wake-up word, with the user providing one or more initial pronunciations of the wake-up word. The wake-up word may be unique, or at least not determined beforehand by a device manufacturer or developer of the digital assistant. The initial pronunciation(s) of the keyword may then be augmented with other potential pronunciations of the wake-up word that might be provided in the future, and those other potential pronunciations may then be pruned down to a threshold number of other potential pronunciations. One or more recordings of the initial pronunciation(s) of the wake-up may then be used to train a phoneme recognizer model to better recognize future instances of the wake-up word being spoken by the user or another person using the initial pronunciation or other potential pronunciations.

20 Claims, 14 Drawing Sheets

OFFLINE PHONEME-GRAPHEME TRANSLATION MODEL DEVELOPMENT

(56) References Cited

U.S. PATENT DOCUMENTS

| | | |
|---|---|---|
| 11,087,745 B2 * | 8/2021 | Nakamura .............. G10L 15/18 |
| 2006/0031069 A1 | 2/2006 | Huang et al. |
| 2011/0184723 A1 | 7/2011 | Huang et al. |
| 2012/0116766 A1 | 5/2012 | Wasserblat et al. |
| 2013/0006612 A1 | 1/2013 | Xu et al. |
| 2017/0177569 A1 * | 6/2017 | Raemy ................... G06F 40/55 |
| 2017/0287474 A1 * | 10/2017 | Maergner .............. G06F 40/211 |
| 2018/0233163 A1 * | 8/2018 | Eagleman ............... G10L 15/02 |
| 2018/0336880 A1 * | 11/2018 | Arik ........................ G10L 13/08 |
| 2019/0043481 A1 * | 2/2019 | Georges ................ G10L 15/063 |
| 2019/0096390 A1 * | 3/2019 | Kurata .................. G10L 15/063 |

* cited by examiner

ILLUSTRATION OF THE SAMPLE-BASED PRONUNCIATION PRUNING

CUSTOMIZABLE KEYWORD SPOTTING SYSTEM WITH KEYWORD ADAPTATION

FIELD

The application relates generally to technically inventive, non-routine solutions that are necessarily rooted in computer technology and that produce concrete technical improvements. In particular, the present application relates to use of neural networks and other technology to identify a wake-up word or other keyword to trigger a digital assistant response, where the keyword is not predetermined.

BACKGROUND

Wake-up word detection is often used to trigger a digital assistant executing at a device to begin listening for a task or request for information that is verbally provided by a human and to which the assistant may respond. The assistant may be embodied in a robot, a smart phone, a smart speaker, etc. and may be, as an example, Amazon's Alexa® or Apple's Siri®.

However, current technology is limited in that a typically single, predefined, and universal wake-up word (often times, the name itself given to the assistant) lacks personalization. This limitation is intentional to make "keyword spotting" of the wake-up word as accurate as possible when attempting to detect the wake-up-word in real-time speech because the current methods used for keyword spotting often require training a neural network used for keyword spotting on thousands of training samples from a multitude of speakers speaking the predetermined wake-up word to refine the assistant's accuracy in identifying the wake-up word to an adequate level. There are currently no adequate solutions to the foregoing computer-related, technological problem.

SUMMARY

The present application recognizes that in the exponentially expanding world of personalized robots, communicational conversational agents, and other types of digital assistants, there is a need for a technological solution that can help users assign their own a wake-up word name (or more generally, a keyword) for the assistant and use that name to activate and converse with the assistant. The present application also recognizes that different users might engage with the same device/digital assistant at different times and may wish to each give the same assistant a different wake-up word or name.

Based on the foregoing, the present application further recognizes that customizable wake-up word/keyword spotting can be implemented and used in a multitude of applications without training a neural network on thousands upon thousands of training samples of different people speaking the keyword.

Accordingly, in non-limiting examples consistent with present principles, "customizable keyword spotting" may be thought of as a trainable keyword spotting methodology that has the capability of adding new keywords/wakeup-words by registering a particular new keyword/wakeup-word offline locally at the device without the aid of a server. The assistant may then begin detecting the newly added keyword/wakeup-word in continuous real-time and "offline" speech, again without the aid of a server to validate that the keyword has been spoken (although in some embodiments a server may be used for such purposes). The system/device embodying the assistant may even be adapted to the human speaker during a registration process to make the system more familiar with the speaker's voice by a process of short-term keyword adaptation. This keyword adaptation may also be performed in both the shorter and longer term using the speaker's conversation with the assistant over time to improve the system's accuracy to detect wake-up word by a speaker.

In more detail, in example embodiments phonemes spoken by a person may be detected and the system may decode a keyword being spoken via the phonemes using a phoneme-keyword decoder to detect the keyword. For accomplishing this, a phoneme recognizer model may be developed by first choosing a sufficient dataset for training and evaluation of the model and applying it to the keyword. For example, TIMIT corpus may be used as it has sufficient annotated phoneme boundaries to train an efficient phoneme recognizer model, though it is to be understood that multiple other corpuses may be used. Recurrent neural network-based methods may be used to train the phoneme recognizer model in accordance with present principles, and in some examples a connectionist temporal classification (CTC)-based warping method specifically may be used.

Then with this phoneme recognizer model, pronunciation augmentation and pruning may occur prior to the aforementioned keyword adaptation to accurately decode a possible keyword from a phoneme sequence. In order to do that, the system having the phoneme recognizer model may be trained to detect approximately the graphemes from the phoneme sequence. In non-limiting examples, a phoneme may be one or more units of a phonetic system that represent a single sound made by a user (e.g., "ch" in "Charlie") and a grapheme may be one or more units of a writing system that represent an individual phoneme. Thus, for example, given a particular phoneme sequence, the most probable grapheme sequence representation(s) may be derived. Many phonemic variations for each graphemic sequence may then be determined, with a sequitur tool used to generate the top N phonemic variations (e.g., N=5) of a grapheme sequence with the aid of a vocabulary/dictionary (e.g., of around 80,000) to generate possible meaningful phoneme sequences for the keyword and thus mimic the possible variations of a phoneme sequence used to speak the keyword since the user may not speak the same keyword exactly the same every time. An example of this is shown in FIG. 14, with a single grapheme 1400 (C H A R L I E) fed into a sequitur G2P tool 1402 to render plural phonemes 1404 (CH AA R L IY, CH AA R L AY, SH AA R L IY, etc.). Pruning may then be done to reduce the possible number of variations of the phoneme sequence to reduce processing time while still keeping the most accurate variations.

The phoneme sequence may then become input and the grapheme sequence may become output of the deep learning model training, where the model that may establish the phoneme recognizer may be trained using sequence-to-sequence training during adaptation. Once this model is trained, it may use the phonemes generated by the phoneme recognizer model and pass it to a sequence-to-sequence P2G model for subsequent decoding of the keyword when the user speaks it in real time. An overview of this is shown in FIG. 15, where speech 1500 is fed into a phoneme recognizer model 1502 of a keyword decoder 1504 to ultimately decode a keyword spoken by a user post-registration of the keyword.

Furthermore, in accordance with present principles the system may detect a keyword/wake-up word in two modes: isolated keyword mode in which the keyword is spoken but unaccompanied by surrounding speech to help identify that the system should be triggered, and a mode of the keyword being spoken around other pre-registered word(s) to help identify that the system should be triggered. But to assist with either mode, it is to be understood that the system may incorporate keyword adaptation techniques in its customizable key word spotting system (CKWS) architecture. This may involve investigation by the system to attempt to improve the keyword recognition accuracy by using short-term and long-term speaker characteristics.

Accordingly, in one aspect a method for identifying a keyword in speech includes detecting first phonemes in the speech, converting the first phonemes to first graphemes, adding second graphemes from a dictionary to the first graphemes to render an augmented set of graphemes, converting the augmented set of graphemes to a set of second phonemes, pruning the set of second phonemes to render output phonemes, and identifying the keyword based at least in part on the output phonemes. The method may be executed using at least one neural network adapted to a human generating the speech, and the keyword in the speech may be indicated by a user and may not be predetermined before being indicated in the speech.

In non-limiting examples, the dictionary may include base words and translated words. Each base word may be correlated to "K" phoneme mappings and each translated word may be correlated to "N" phoneme mapping. Each base word may also be correlated to "M" translated words. "K", "N", and "M" may be integers, and at least "K" may be greater than one.

In some implementations, the method may include indicating to a user to speak the keyword a predetermined number of times greater than one, and also indicating to the user that the keyword should contain at least three phonemes.

Also in some implementations, pruning the set of second phonemes may include removing repeated phoneme sequences from the set of second phonemes. Pruning the set of second phonemes may also include eliminating phoneme sequences from the set of second phonemes if a particular phoneme sequence is shorter than a threshold sequence length. Still further, pruning the set of second phonemes may include eliminating phoneme sequences from the set of second phonemes if a first phoneme sequence in the set of second phonemes is not similar to a second phoneme sequence established by the first phonemes. The similarity may be measured using a fused distance metric based on a Jaro Winkler normalized distance and based on a Demerau Levenshtein normalized distance, such as the equation $$d = \frac{\alpha * dl + (1 - \alpha) * jw}{2},$$

where $\alpha$ is a weighting parameter, where dl is the Demerau Levenshtein normalized distance, and where jw is the Jaro Winkler normalized distance.

Additionally, in some examples pruning the set of second phonemes may include pruning based on sample matching of positive and negative samples, where phoneme sequences from the set of second phonemes may be eliminated if matched only to a negative sample. Phoneme sequences from the set of second phonemes that are matched to positive and negative samples may not be eliminated from the set of second phonemes if a weighted average of matched samples is greater than a threshold.

In some examples, the detecting may be performed using a phoneme recognizer model and the method may also include training, subsequent to the pruning, the phoneme recognizer model based on one or more recordings indicating the first phonemes. In these examples, the output phonemes may be first output phonemes, the phoneme recognizer model may be a first phoneme recognizer model, and the training may render a second phoneme recognizer model from the first phoneme recognizer model. The method may then include using, subsequent to the training, the second phoneme recognizer model to render second output phonemes and then either adding the second output phonemes to the first output phonemes for attempts to identify the keyword based on both the first and second output phonemes, or replacing the first output phonemes with the second output phonemes for attempts to identify the keyword based on the second output phonemes but not the first output phonemes.

In another aspect, a method for identifying a keyword in speech includes detecting a first phoneme sequence in the speech based on the keyword being spoken in a first instance, using the first phoneme sequence to identify a first grapheme sequence, and identifying at least second and third grapheme sequences from a dictionary based on the first grapheme sequence. The method further includes converting the second grapheme sequence to at least second and third phoneme sequences and converting the third grapheme sequence to at least fourth and fifth phoneme sequences. The method then includes using at least one of the second, third, fourth, and fifth phoneme sequences to identify the keyword being spoken again in a second instance, with the second instance occurring subsequent to the first instance.

Also, in some example implementations the method may include eliminating the second phoneme sequence and identifying the keyword being spoken again in the second instance using at least one of the third, fourth, and fifth phoneme sequences but not using the second phoneme sequence.

Still further, in some examples the first phoneme sequence may be detected using a first phoneme recognizer model and the first phoneme sequence in the speech may be stored as one or more recordings. In these examples, the method may include using the one or more recordings to adapt the first phoneme recognizer model to a person that provided the speech. The one or more recordings may be used to train the first phoneme recognizer model to the person to render a second phoneme recognizer model, where the second phoneme recognizer model may be used to identify the keyword being spoken in the second instance.

In still another aspect, an apparatus includes at least one processor and at least one computer storage that is not a transitory signal. The computer storage includes instructions executable by the at least one processor to register, using a first phoneme recognizer model, a wake-up word for a digital assistant based on recordings of a person speaking the wake-up word at least in part by adding first phoneme sequences derived from the recordings to a dictionary accessible to the first phoneme recognizer model. The instructions are also executable to train the first phoneme recognizer model using the recordings of the person speaking the wake-up word to render a second phoneme recognizer model. The instructions are then executable to replace the first phoneme recognizer model with the second phoneme recognizer model, again register the wake-up word for the digital assistant based on the recordings but using the second phoneme recognizer model, and update the dictionary by adding second phoneme sequences that are derived from the recordings using the second phoneme recognizer model.

In some examples, the recordings may be first recordings, the person may be a first person, and the wake-up word may be a first wake-up word. In these examples, the instructions may also be executable to register, using the second phoneme recognizer model, a second wake-up word for the digital assistant based on second recordings of a second person speaking the second wake-up word at least in part by adding third phoneme sequences to the dictionary. The third phoneme sequences may be derived from the second recordings, where the second recordings may be different from the first recordings, the second person may be different from the first person, and the second wake-up word may be different from the first wake-up word. Also in these examples, the instructions may be further executable to train the second phoneme recognizer model using the second recordings to render a third phoneme recognizer model, replace the second phoneme recognizer model with the third phoneme recognizer model, again register the second wake-up word for the digital assistant based on the second recordings but using the third phoneme recognizer model, and update the dictionary by adding fourth phoneme sequences that are derived from the second recordings using the third phoneme recognizer model.

The details of the present application, both as to its structure and operation, can best be understood in reference to the accompanying drawings, in which like reference numerals refer to like parts, and in which:

DETAILED DESCRIPTION

Figure 1:
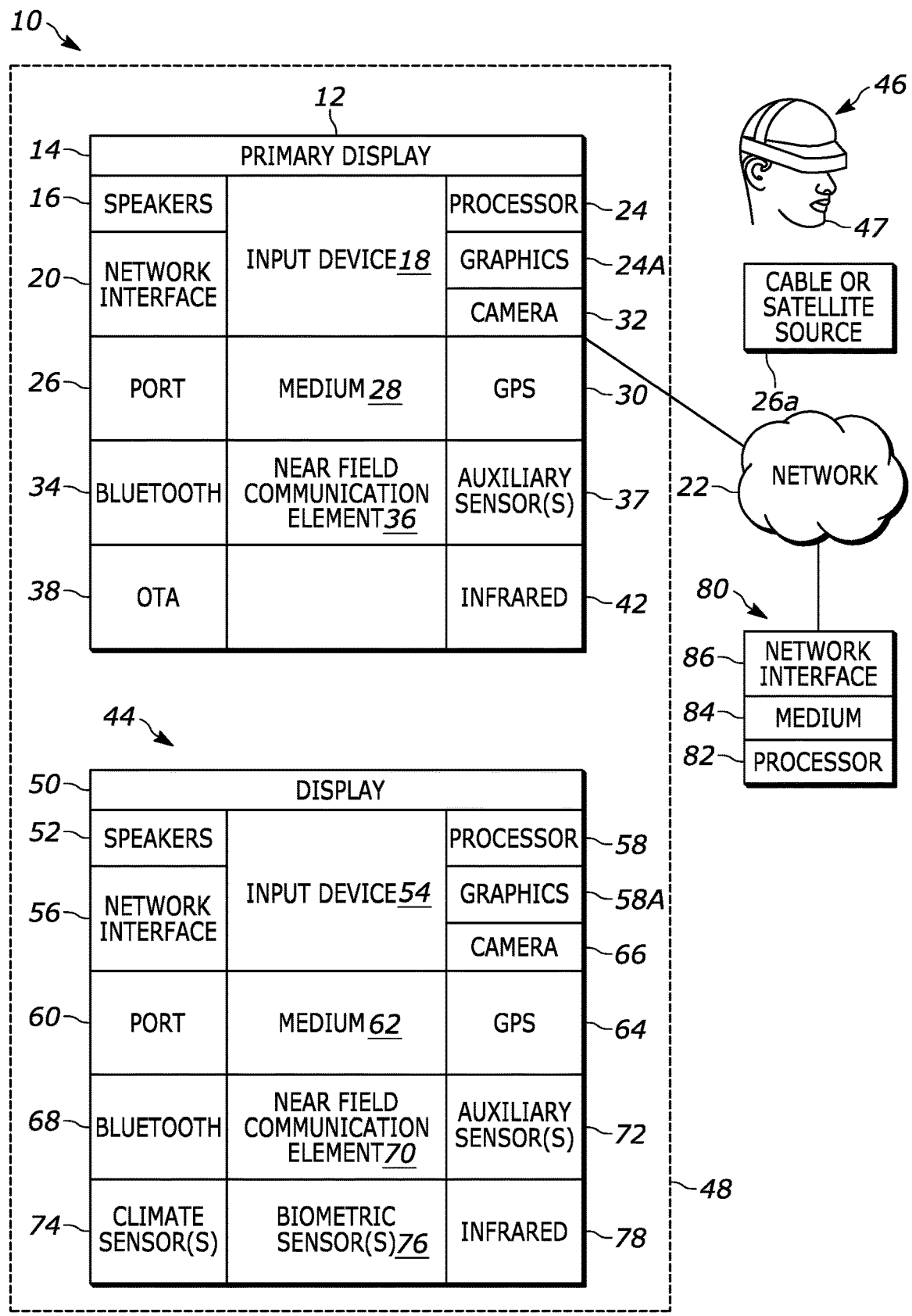
FIG. 1 is a block diagram of an example network of devices consistent with present principles, where each device may embody a keyword recognizer system as described herein.

This disclosure relates generally to computer ecosystems including aspects of consumer electronics (CE) device networks such as but not limited to distributed computer game networks, augmented reality (AR) networks, virtual reality (VR) networks, video broadcasting, content delivery networks, virtual machines, and artificial neural networks and machine learning applications. A system herein may include server and client components, connected over a network such that data may be exchanged between the client and server components. The client components may include one or more computing devices including game consoles such as Sony PlayStation® or a game console made by Microsoft® or Nintendo® or other manufacturer, virtual reality (VR) headsets, augmented reality (AR) headsets, game controllers, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux® operating systems, operating systems from Microsoft®, or a Unix® operating system, or operating systems produced by Apple® or Google®. These operating environments may be used to execute one or more browsing programs, such as a browser made by Microsoft® or Google® or Mozilla® or other browser program that can access websites hosted by the Internet servers discussed below. Also, an operating environment according to present principles may be used to execute one or more computer game programs in accordance with present principles.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or video game website to network users to communicate in accordance with present principles.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, an augmented reality (AR) headset, a virtual reality (VR) headset, Internet-enabled or "smart" glasses, another type of wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 (e.g., a central processing unit (CPU). A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44 and may implement some or all of the logic described herein.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to, for example, determine the location of the AVD 12 in all three dimensions.

Continuing the description of the AVD 12, in some embodiments the AVD 12 may include one or more cameras 32 that may be, e.g., a thermal imaging camera, a digital camera such as a webcam, an infrared (IR) camera, and/or a camera integrated into the AVD 12 and controllable by the processor 24 to gather pictures/images and/or video in accordance with present principles.

Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element. Zigbee® also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47 that has one or more joysticks, one or more push buttons, etc. In the example shown, only two CE devices 44, 46 are shown, it being understood that fewer or greater devices may be used.

In the example shown, all three devices 12, 44, 46 may be members of an entertainment network, e.g., in a home/house or that is distributed over several locations. Thus, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer, video game console, or video game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display(s) 50. Additionally, or alternatively, the display(s) 50 may be an at least partially transparent display such as an AR headset display or a "smart" glasses display or "heads up" display, as well as a VR headset display, or other display configured for presenting AR and/or VR images.

The first CE device 44 may also include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note that the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44, and/or the CE device 44 may be powered via wired connection to a wall outlet. The CE device 44 may communicate with the AVD 12 through any of the above-described communication modes and related components.

The second CE device 46 may include some or all of the components shown for the CE device 44. Either one or both CE devices may be powered by one or more batteries and/or wall outlet connections.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

As understood herein, machine learning may be a serialized process that involves identifying, obtaining, and preparing raw data sets, feature engineering and generating extract, transform, and load (ETL) jobs that transform the raw data into features for the machine learning models, and designing and coding the machine learning models. The models may be "trained" in a computing-intensive task. The models may even be evaluated for performance and latency.

Before moving on to the description of other figures, it is to be understood in accordance with present principles that the present application contemplates two phases. Specifically, the present application contemplates both a registration phase/process and a detection phase/process. During the registration phase, a user may be prompted by the system (e.g., audibly via a speaker or visually via a display) to provide audio samples of a keyword (e.g., a name, specifically) that the user wishes the assistant to be triggered by and respond to in order to listen for an ensuing command from the user. The name provided by the user need not even be a preexisting proper name or even an existing word in the user's language (or any language for that matter).

Further, the system's prompt may instruct the user to not only speak the user's desired name for detection by a microphone accessible to the system, but to speak the desired name a threshold number of times greater than one, such as five times. The prompt may also instruct the user to use a keyword/name greater than a certain length, such as a name of at least three syllables or alphabetical letters (which may thus indicate at least three phonemes) since a name of less than three phonemes may affect the accuracy of detecting the name in the future as it may result in false detections of the name when in fact the user might have not been attempting to trigger the system.

Further still, the prompt may also instruct the user to not engage in registration by speaking the name the predetermined number of times while the user has a physical condition that might adversely affect clear pronunciation of the name, such as a cold or sore throat.

Assuming the user does not have a physical condition affecting pronunciation of the user's desired name, the user may then speak the name the predetermined number of times when instructed by the system. The system may then record each utterance of the name based on detection of the speech via the microphone. The system may then complete the registration phase without further input from the user by using the recorded speech waveforms to register the name/keyword.

Furthermore, it is to be understood that during registration, simple consistency measurements may be used to eliminate outliers such as pronunciation sounds from instances of the user speaking the desired name that are markedly different from other instances of the user speaking the desired name that might also be recorded during the same registration. Furthermore, only pronunciations longer than certain minimal phoneme length and that are consistent with other enrolling samples (other instances of the user speaking the name) may be counted as valid.

Briefly, the second phase (the decoding phase) involves subsequent detection in real-time of the name when spoken by the user. This might sometimes be referred to as "decoding", and can trigger the assistant to "listen" for an ensuing command or request from the user with which to comply. The second phase uses the phoneme recognizer model trained during the first phase and initially established using a sequence-to-sequence model (e.g., trained using connectionist temporal classification) and a TIMIT corpus (and/or multiple other corpuses) to detect the phonemes from the input speech. During the second phase, detected phonemes may be passed through a unique keyword decoder at phoneme level, e.g., a keyword matcher using phoneme sequence similarity measurements to detect the spoken keyword.

Figure 2:
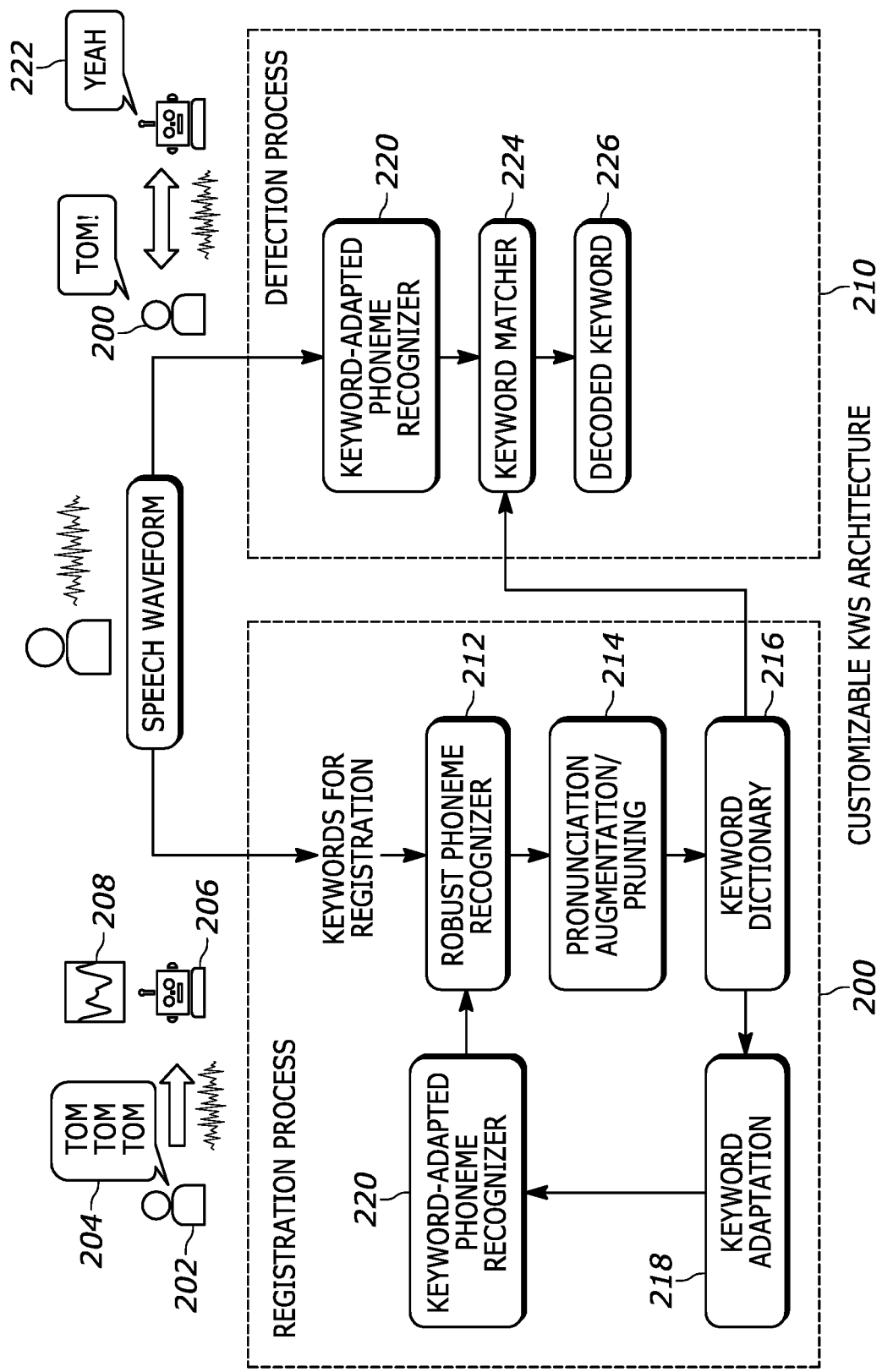
FIGS. 2 and 3 show architecture for a keyword spotting system in accordance with present principles.
Figure 3:
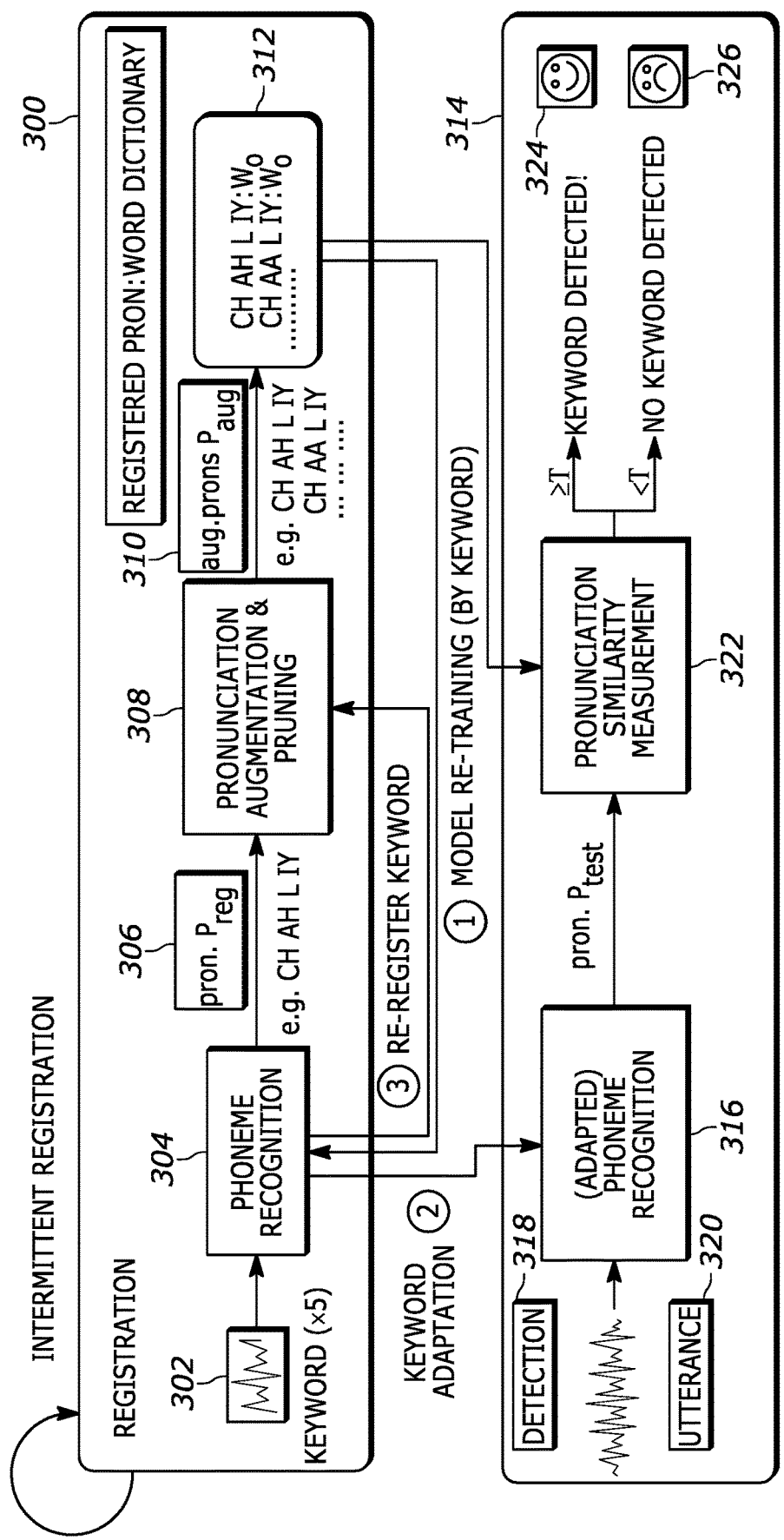

Now in reference to FIGS. 2 and 3, they show architecture for a keyword spotting system in accordance with present principles. FIG. 2 shows the architecture in a simpler form than FIG. 3 in some respects.

Beginning first with FIG. 2, it shows both the registration phase 200 and the detection/decoding phase 210. A user 202 speaks the user's desired name, "Tom", three times 204 which is then detected by the system 206 to render speech waveforms 208. As shown, during the registration phase the name "Tom" as spoken by the user 202 is input into a phoneme recognizer artificial intelligence model 212, which outputs a phoneme sequence indicating the phonemes recognized from the user's speech and provides the outputs to a pronunciation augmentation and pruning model 214 for augmentation and pruning of related phonemic sequences that may be recognized during the detection phase 210 as indicating the name "Tom". Pronunciation augmentation and pruning will be discussed further below. But still in reference to FIG. 2, the pronunciation augmentation and pruning model 214 may then adjust a keyword dictionary 216 based on the augmentation and pruning, with a base version of the dictionary 216 being selected by the system's developer beforehand and including various grapheme entries and one or more corresponding phonetic variations for each grapheme entry.

Thereafter, keyword adaptation 218 may be performed in which the phoneme recognizer model 212 may be trained using connectionist temporal classification (CTC)-based warping and the user's speech 204 as training data to adapt the phoneme recognizer model 212 to the user's speech. The phoneme recognizer model 212 may then be replaced by the adapted phoneme recognizer model 220 for subsequent decoding of the name when spoken and used as streaming audio during the detection phase 210 (though in some embodiments the phoneme recognizer model 212 may also be used for decoding during the detection phase). Keyword adaptation may include alteration of the phoneme recognizer model(s) towards the speaker's speech characteristics in order to improve keyword detection of that speaker. Thus, the keyword adaptation model 220 may be used to improve recognition accuracy of keyword detection as shown in FIG. 2 and FIG. 3 and further adaptation may occur each time the system correctly recognizes "Tom" during a detection phase 210 so that additional training may occur over time when the user triggers the assistant.

Describing the detection phase 210 as shown in FIG. 2 in more detail, during the detection phase 210 the user 200 may thus speak the name the user provided to the system as a wake-up keyword again, which may trigger the system to respond with an audio phrase 222 indicating that it has been triggered and is awaiting further user input for a task or command to execute. As the detection phase 210 of FIG. 2 shows, the adapted phoneme recognizer 220 may be used to identify the user 200 as speaking the phrase "Tom" using a keyword matcher/decoding module 224 to match the phonemes detected from the phrase "Tom" to an entry in the dictionary 216 to thus render a decoded keyword 226 and trigger the system. Matching by the keyword matcher/decoding module 224 may be done using a streaming adaptive match, and/or using a distance metric to evaluate the distance between stored keyword phoneme sequences in the dictionary 216 and the phonemes streamed in output from the adapted phoneme recognizer 220 for the phrase "Tom" as spoken by the user 200 to determine whether any entries in the dictionary 216 match the output to within a threshold distance.

FIG. 3 in particular shows how intermittent keyword registration may also be used. But before describing FIG. 3 in detail, it is to be understood that intermittent registration may allow the user to register new keyword pronunciations at a later time. This may occur if he/she is not satisfied with the wake-up response from a prior registration, which the user might realize if the system is either "too sensitive" and is triggered by false positives when the user did not in fact speak the name it previously gave to the system or if the system does not actually respond and wake up when the keyword is spoken by the user.

The user can select the registration mode again for intermittent registration whenever he/she desires (e.g., either by providing an audible command to do so upon successfully triggering the system, based on input to a selector presented on the display to again initiate registration, etc.). Additionally or alternatively, the system itself may trigger intermittent registration if the system determines that the user's voice has changed (e.g., due to no longer having a cold or sore throat as when initial registration might have been performed). The system may also trigger intermittent registration itself if the system determines that the user has been asking the same question a threshold number of times greater than one all within a threshold time of each other, with the question being identified by the system each time it is provided even if it did not trigger a wake-up until on or after the threshold number of times is reached. Regardless, this new registration phase may occur the same as the initial registration, which may require the user to pronounce the preferred keyword again a threshold number of valid times.

Furthermore, it is to be understood that during intermittent registration the user may be permitted to even provide a different name or pronunciation as a keyword for system wake-up, and after registration of this different name it may be used to trigger system wake-up in addition to the previously-provided name also still being usable for triggering system wake up. However, it is to be further understood that during an intermittent registration the user may provide additional samples of the same wake-up word name as was provided during the initial registration.

Further still, in some implementations different users may engage in different registrations (one of which may be intermittent) so that different users may assign different names as respective wake-up words that may each trigger the same assistant/system, regardless of which user (or even another person) might subsequently speak any registered name to thus trigger the system. Thus, multiple different names/keywords may be assigned to a digital assistant for triggering the digital assistant to take action based on a verbal command.

Also during intermittent registration, a user may be provided with the option of either keeping the previous registration instances (and appending the newly registered pronunciations into the pronunciation dictionary), or validating, reviewing and/or deleting specific unwanted previous registration instances. This may be done either through an audible back-and-forth between the system and user, via a graphical user interface (GUI) presented on a display, etc. For example, during registration validation in intermittent registration, the user may simply pronounce his/her keyword several times and the system may show him/her any identified matchings to recordings (e.g., wave files) from a previous registration. The user may then delete any registration instance from the previous registration that is returned as not matching a pronunciation provided at the beginning of registration validation.

Now specifically describing what is shown in FIG. 3, during an intermittent registration 300 the user may speak as input 302 the desired name/keyword a threshold number of times. A phoneme recognizer model 304 that may or may not have been previously adapted to one or more users may then use the input to render a pronunciation output 306 designated as $P_{reg}$ (e.g., "CH AH L IY"). The output 306 may then be provided as input to a pronunciation augmentation and pruning model 308 to render an augmented set 310 of pronunciation outputs $P_{aug}$ that may be greater than one. Both the pronunciation output 306 and augmented set 310 may then be entered into a dictionary 312.

Then keyword adaption 314 may occur, where the phoneme recognizer model 304 may be retrained to render an adapted phoneme recognizer model 316 that may replace the phoneme recognizer model 304 and then be used during a detection phase 318. Also during adaptation 314, the same input 302 may be used to again render a pronunciation output but using the model 316 instead, and that output may then be provided as input to the pronunciation augmentation and pruning model 308 to render another augmented set of pronunciation outputs. These pronunciation outputs may then be used during the detection phase 318 to determine, given an output pronunciation $P_{test}$ from the adapted phoneme recognizer model 316 based on an input 320 from a user, a pronunciation similarity measurement 322 of the output pronunciation $P_{test}$ to determine if it is similar to at least a threshold amount T to these pronunciation outputs. As shown, the keyword may be detected/identified 324 if the similarity measurement is greater than or equal to the threshold T, or not detected/identified 326 if the similarity measurement is less than the threshold T.

Figure 4:
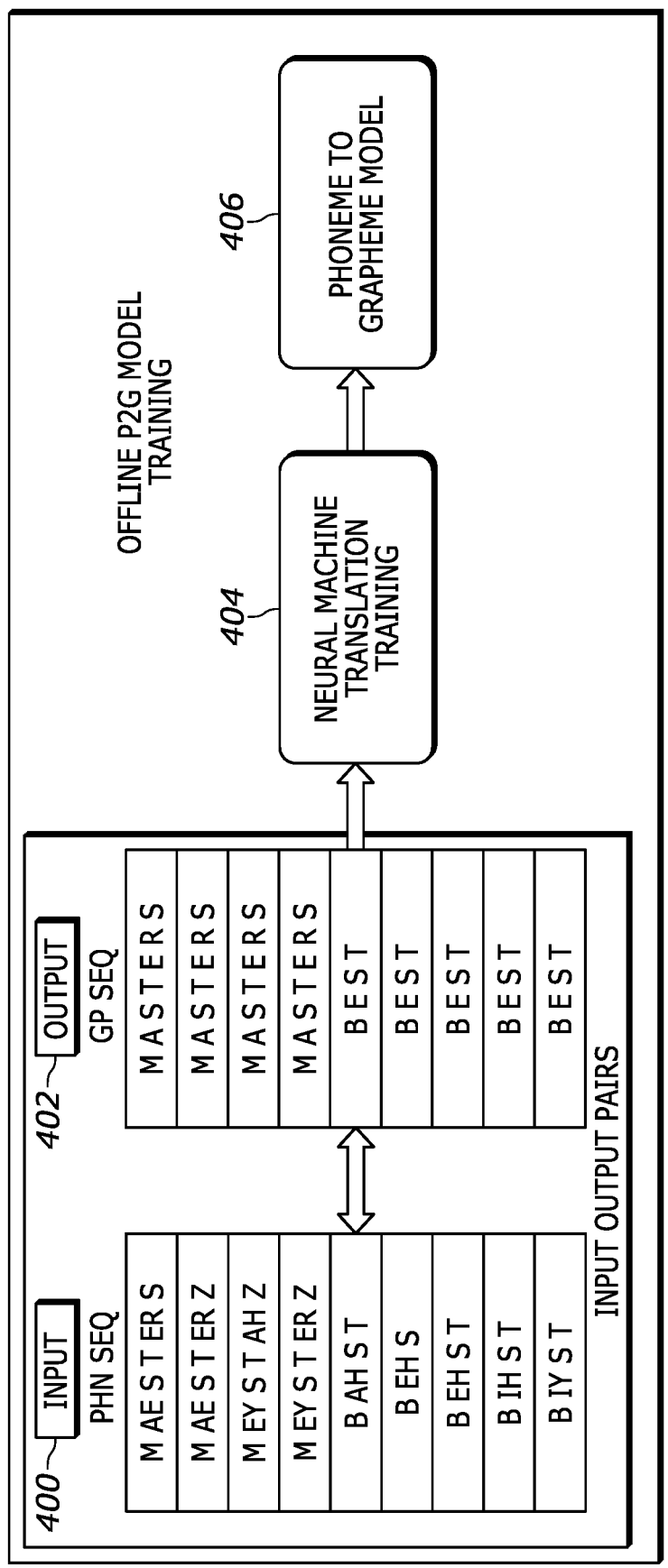
FIG. 4 shows example input/output phoneme and grapheme pairs for offline P2G model training in accordance with present principles.

Now describing pronunciation augmentation in more detail, and specifically phonetic dictionary augmentation as an aspect of pronunciation augmentation, reference is made to FIG. 4. And to reiterate, note that the system may be phoneme recognition-based. The phoneme recognizer model may thus detect a sequence of phonemes (which may be the building blocks of speech-lexical representation) using the user's input speech. Then for the system to identify if a keyword is present in the user's speech, a phoneme to grapheme model may be used.

It being understood that phonemes indicate very rudimentary information, the system may be configured to predict many possible varied pronunciations of the spoken keyword by training a neural network model using neural machine translation (NMT), which may learn to generate some or all possible graphemic combinations for a phonetic input. Herein, this is called phoneme to grapheme (P2G) model development.

To develop a P2G model, neural translation technique(s) may be used. As shown in the example of FIG. 4, for a given word there may be various meaningful phonetic representations which represent various ways of possible pronunciation of the word. This itself may not always be a one-to-one mapping. But for a given phoneme sequence listed as input 400 in FIG. 4, the system may identify the corresponding approximate/nearest grapheme sequence(s) as output 402 to establish input/output pairs, one to one, as shown.

As also shown in FIG. 4, neural machine translation training 404 may occur using these pairs to develop a P2G model 406. The model may have been built by the system's developers to take phoneme and grapheme pairs as input and target sequences. This developed phoneme-to-grapheme model may then learn how to generate a grapheme sequence for a given phoneme sequence. This model may be trained offline at a device housing the system without the aid of a server.

Moving on from FIG. 4 and to aid the reader's understanding in accordance with present principles, a P2G system may take one phoneme sequence and generate one translated grapheme sequence based on that. A G2P system may be thought of as an inverse to the P2G system and may use one or more systems from the text-to-speech field. The G2P system may take one grapheme sequence (or word, in some embodiments) and generate N possible phonetic pronunciation variations for the given grapheme sequence (or word). Such a G2P system may be used to generate input-output pairs as shown in FIG. 4 to build the P2G model/system 406.

Furthermore, phnseq$_{phnrec}$ as used herein may be a phoneme sequence generated by a phoneme recognizer model by feeding in a speech signal. Grapheme$_{raw}$ as used herein may establish the original grapheme sequence (or word) that is derived from phnseq$_{phnrec}$. Phnseq$_{g2p}$ may be a phoneme sequence generated by the G2P system when taking a grapheme sequence as input. Grapheme$_{trans}$ may be a translated grapheme sequence of a phoneme sequence.

It is to be further understood that if a grapheme sequence (grapheme$_{raw}$) were passed through a G2P system to get a phoneme sequence (phnseq$_{g2p}$) and then this phoneme sequence is passed through the P2G system, a translated grapheme sequence (grapheme$_{trans}$) may be obtained that may or may not match the original grapheme sequence (grapheme$_{raw}$). This is because, as the present application recognizes, such translations are not always absolute or perfect.

Figure 5:
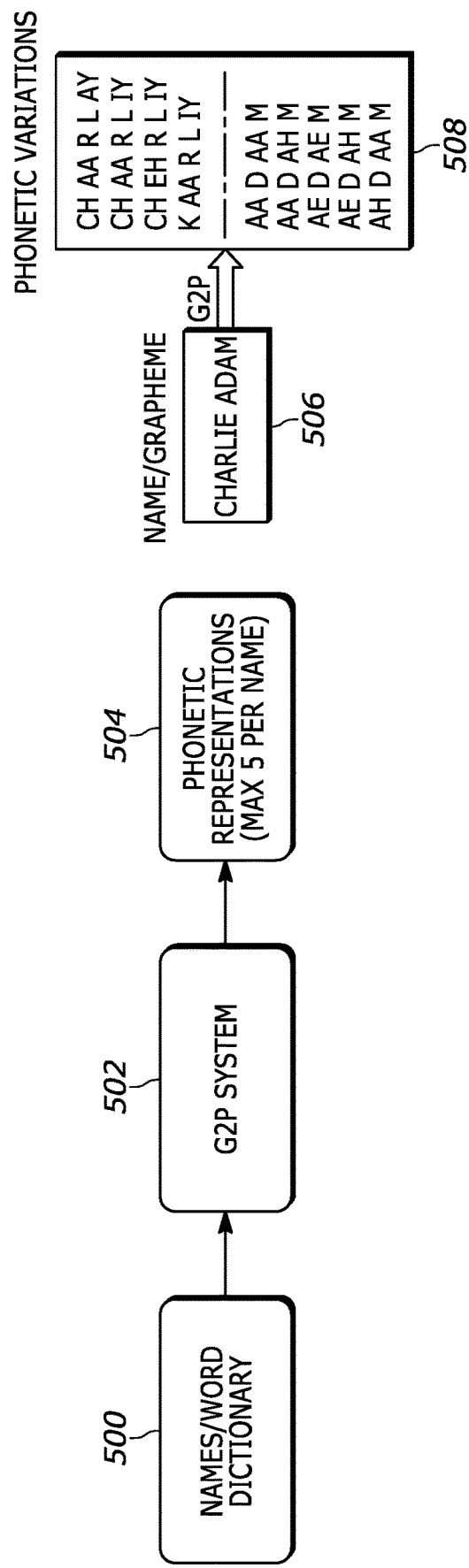
FIG. 5 illustrates actions taken during a first step for phonetic dictionary augmentation in accordance with present principles.

With the foregoing in mind, reference is now made to FIG. 5. At a first step, a relatively large list or dictionary 500 of graphemes (grapheme$_{raw}$), and/or words and proper names, may be collected e.g. by the system's developers. For example, the dictionary 500 may be established by one hundred thirty nine thousand graphemes. Then this dictionary 500 may be passed through a G2P system 502 to generate phonetic sequence variations (phnseq$_{g2p}$) 504, which in example embodiments may be a limited to maximum of five phonetic variations per grapheme/word in the dictionary 500. However, another threshold number of variations other than five may be used in other examples, but in any case the threshold number of variations may be used to cut down on variations to ease processing constraints on the system and allow it to operate efficiently. Example names/graphemes 506 from the dictionary are also shown in FIG. 5, along phonetic variations 508 for each name/grapheme 506.

Figure 6:
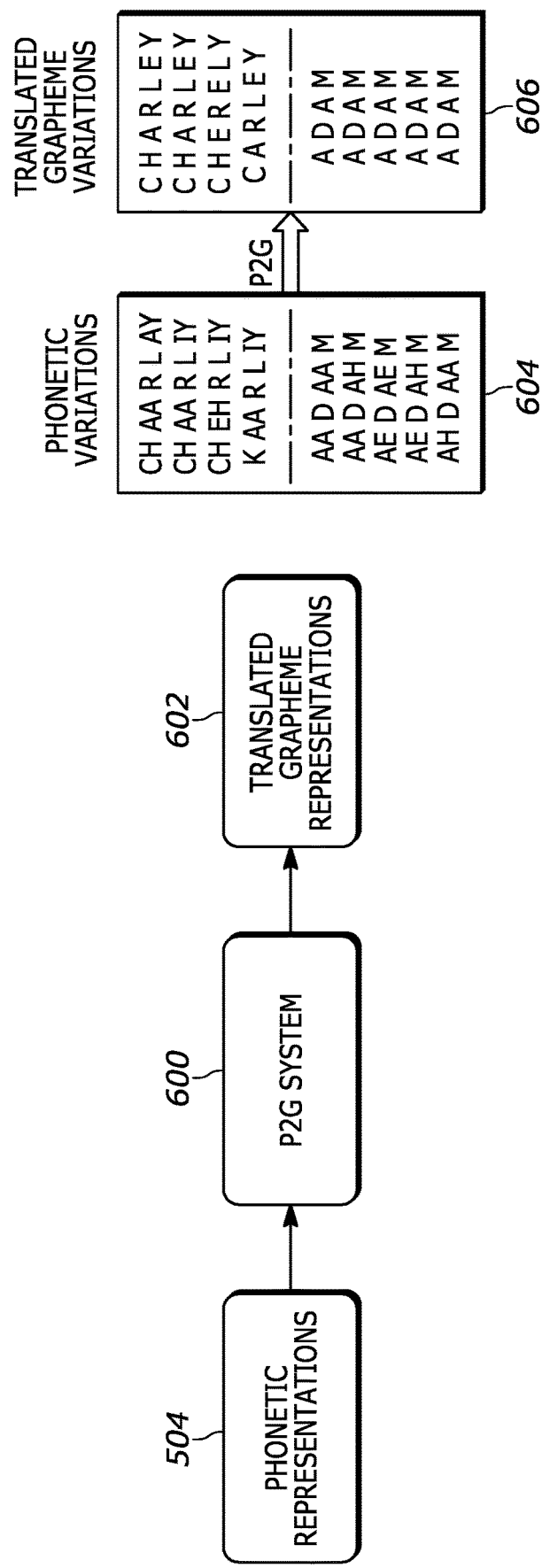
FIG. 6 illustrates actions taken during a second step for phonetic dictionary augmentation in accordance with present principles.

Then at a second step as shown in FIG. 6, every phoneme sequence variation 504 that is obtained may be passed through a P2G system 600 to generate the nearest translated grapheme sequence/representation variations 602 for each phonemic sequence variation 504 passed through the P2G system 600. Thus, as may also be appreciated from FIG. 6, example phonetic sequence variations 604 may be mapped to one or more example translated grapheme sequence/representation variations 606.

Figure 7:
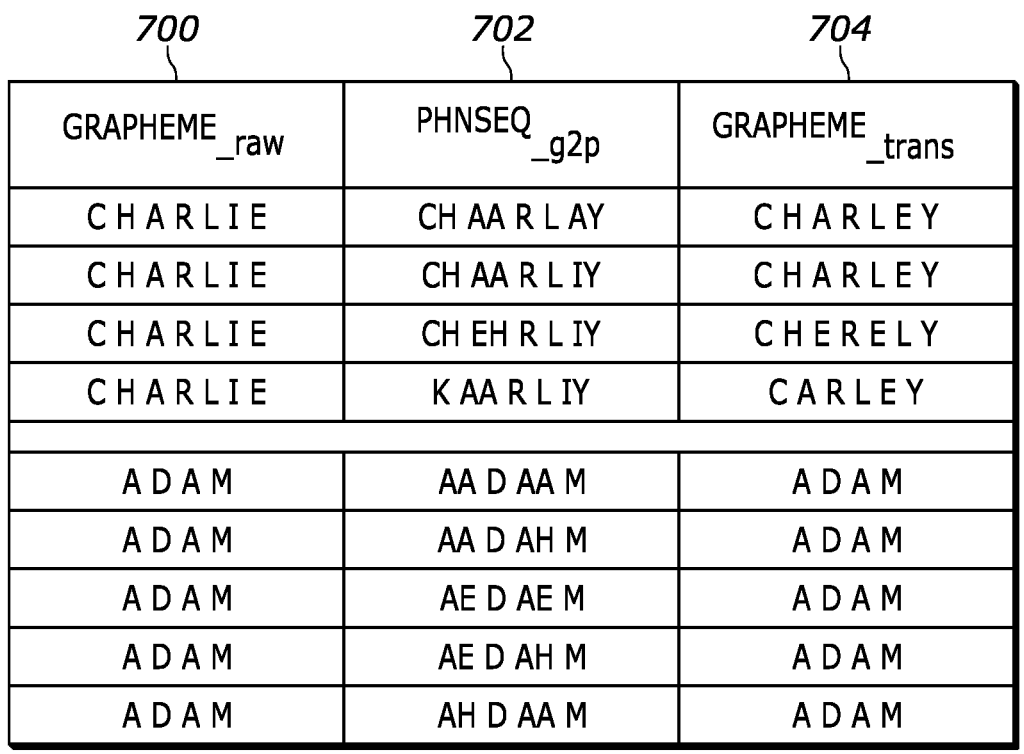
FIG. 7 shows an example of a file of G2P and P2G variations for various words/names in accordance with present principles.

Then at a third step a combined representation of steps one and two may be generated, as shown in FIG. 7. In the example shown in FIG. 7, the file may contain G2P and P2G variations of all graphemes/words in a unified representative way. Thus, the combined representation may include a first column of grapheme$_{raw}$ entries 700, a second column of Phnseq$_{g2p}$ entries 702, and a third column of grapheme$_{trans}$ entries 704, with entries for each row mapped to entries in other columns for the same row.

Thereafter, at a fourth step, given that one of the purposes for these steps may be to find the most-suitable phonetic alternatives for a spoken word during registration so as to improve detection accuracy, P2G mapper development may be executed. Due to potential non-one-to-one mapping of raw graphemes to translated graphemes, similar sounding but different words/grapheme$_{raw}$ may be translated to some of the same graphemes$_{trans}$. For example, graphemes like ["S H E L L E Y", "S H E L L Y"] may get translated to "S H E L L Y". One of the phoneme sequences variations for "Shelley" may thus be the same as has been translated to "Shelly". To have a centralized representation of such similar sounding graphemes (or words), a dictionary may therefore be built at this fourth step that, as returns, gives all similar sounding grapheme$_{raw}$ possibilities given a translated grapheme$_{trans}$. For example, "S H E L L Y": ["S H E L L E Y", "S H E L L Y"], and "P O R T A": ["P U E R T O", "P O R T A", "P O R T O"].

Accordingly, through the above steps and given a translated grapheme sequence, similar sounding graphemes (or words) grapheme$_{raw}$ may be determined and thereby all the phonetic variations associated with those graphemes (or words) may be determined. Thus, a centralized dictionary that has all grapheme$_{raw}$ to phonetic variations and grapheme$_{trans}$ to similar grapheme$_{raw}$ may be established. In some examples, this centralized dictionary may be referred to as a bi-directional P2G, G2P mapping dictionary.

Still describing pronunciation augmentation, but now specifically in reference to pronunciation augmentation using P2G, G2P mapping in accordance with the disclosure set forth above, it is to be understood that during the registration phase, the system may receive five spoken utterances of a keyword from a user (as set forth above).

However, in understanding that this may be a somewhat restricted representation of the user's chosen keyword relative to, e.g., typical speech-to-text models that might have been trained on hundreds or thousands of samples from numerous people using a predefined keyword (e.g., predefined by a device manufacturer), issues can arise such as repeated failures to identify the user's keyword if only those five samples from the user are used to identify the keyword being spoken by the user again during the detection phase. And because the keyword selected by the user might be novel or unique, thousands of samples might not be available as with a developer or manufacturer-predefined keyword and thus the present application recognizes an advantage in generating many possible "meaningful variations" of the user's pronunciations of the keyword so as to help the system to model and detect the user's preferred keyword better.

Figure 8:
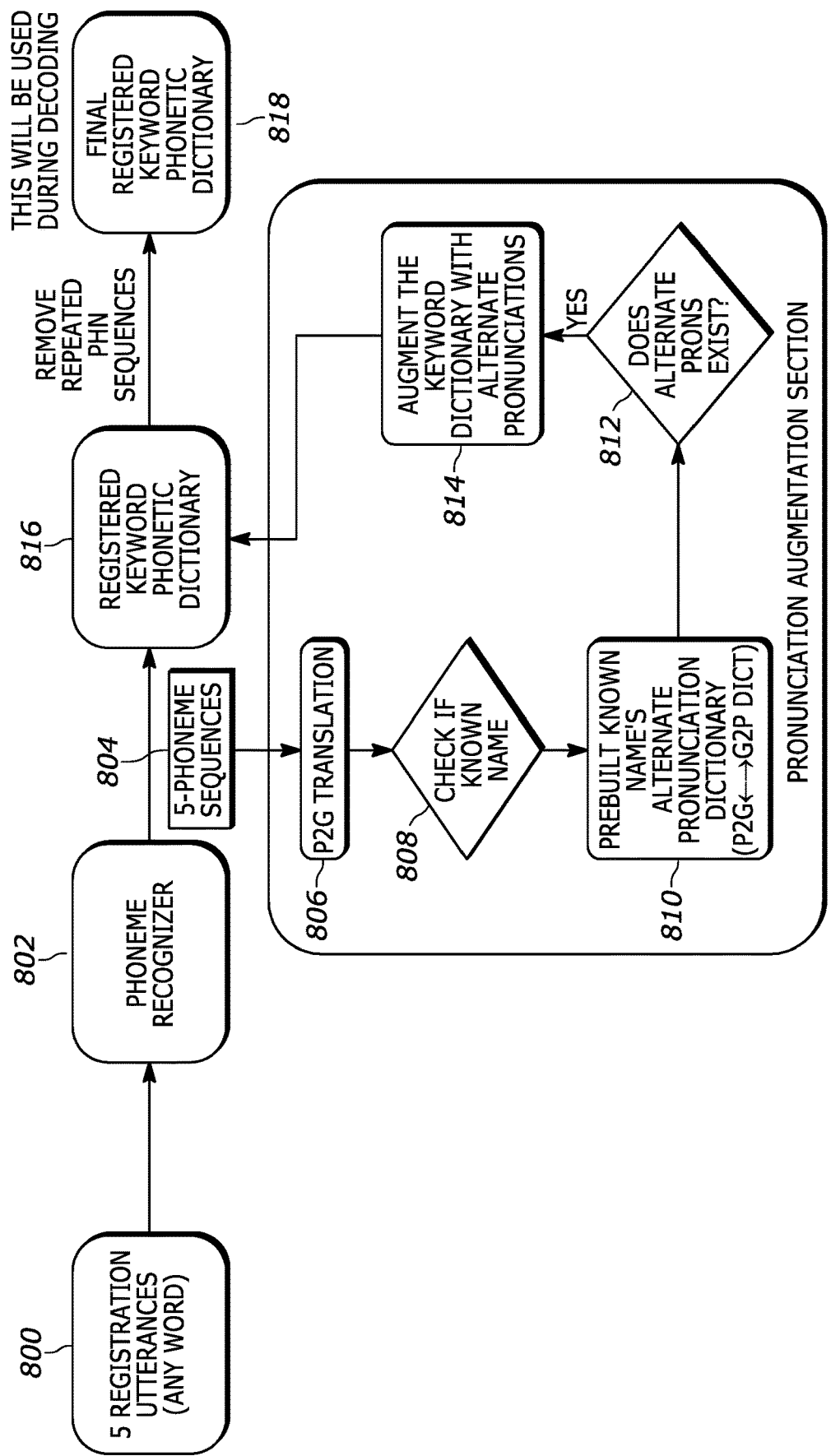
FIGS. 8 and 9 show example flow charts of actions taken during pronunciation augmentation and pruning based on P2G, G2P mapping in accordance with present principles.

Accordingly, reference is made to FIG. 8 to aid understanding of augmenting phonetic variations at a "higher level". As shown in FIG. 8, five registration utterances 800 from a user may be provided to a phoneme recognizer model 802 to output five respective phoneme sequences 804. These sequences 804 are then provided to a P2G translation model 806 for the system to determine at diamond 808 whether any grapheme translation from the P2G translation model 806 corresponds to a predetermined grapheme/name/word in the keyword dictionary, at least within a threshold level of similarity such as eighty percent (e.g., if the actual keyword spoken by the user is a unique, made-up word but still similar to an entry in the dictionary). If no grapheme translation corresponds to a predetermined grapheme/name/word in the keyword dictionary, only the phonetic sequences 804 of the five registration utterances may be used for keyword spotting during the detection phase. But assuming at least one grapheme translation corresponds to a predetermined name or other word in the keyword dictionary, a bi-directional P2G, G2P mapping dictionary 810 as described herein may be accessed to determine at diamond 812 whether any alternate pronunciations exist and, responsive to an affirmative determination at diamond 812, at step 814 the keyword dictionary may be augmented with the alternate pronunciations to establish the registered keyword phonetic dictionary 816. From there, repeated phonetic sequences may be removed from the registered keyword phonetic dictionary 816 to render a final registered keyword phonetic dictionary 818 that may be used during the decoding phase.

Figure 9:
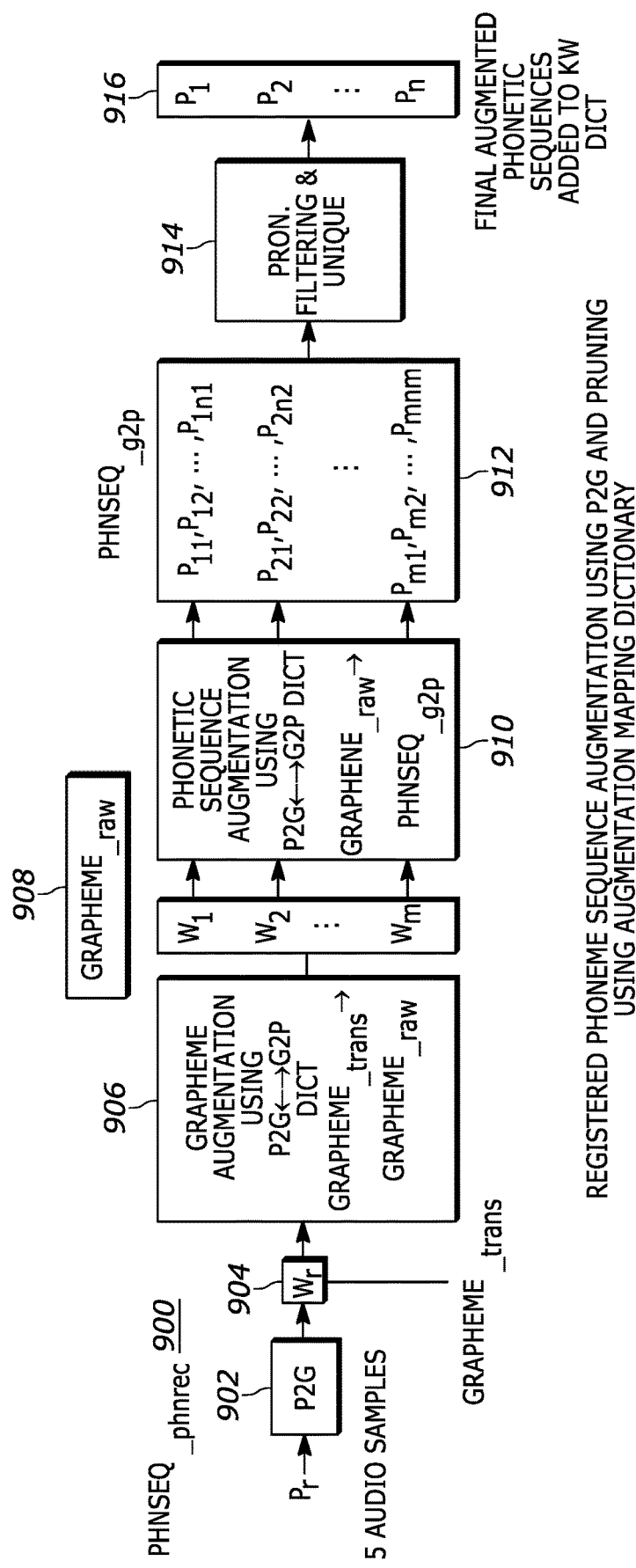

FIG. 9 also illustrates. Phnseq$_{phnrec}$ 900 for a user's five audio samples, designated as P$_r$ in FIG. 9, may be provided as input to a P2G model 902 to output grapheme$_{trans}$ outputs 904, designated as W$_r$ in FIG. 9. W$_r$ may then be provided as input to a grapheme augmentation component/mechanism 906 that uses a P2G, G2P dictionary to render grapheme$_{raw}$ outputs 908 based on the grapheme$_{trans}$ inputs 904. In some examples, the component/mechanism 906 may be composed of a neural network model, text files, and/or algorithms.

The grapheme$_{raw}$ outputs 908 are then listed in FIG. 9 as W$_1$ to W$_m$, which are then are provided as input to a phonetic sequence augmentation model 910 to generate phonetic sequences phnseq$_{g2p}$ 912 using the P2G, G2P dictionary, with plural respective phonetic sequences phnseq$_{g2p}$ corresponding to one grapheme$_{raw}$ (e.g., P$_{11}$-P$_{1n1}$ corresponding to Wi, and P$_{21}$-P$_{2n2}$ corresponding to W$_2$). The phonetic sequences phnseq$_{g2p}$ may then go through a pruning process 914 to be described further below, ultimately rendering final augmented phonetic sequences (P$_1$-P$_n$) 916 that are then added to the keyword phonetic dictionary.

Thus, in order to achieve improved keyword coverage the registered sequence may be augmented with more phonetic variations using the trained P2G model. It may now be appreciated that this procedure may be used to generate phonetic variations to have the "best" suited phoneme sequence representations of the registered keyword in the keyword/wake-up word dictionary for the detection phase. It is to be further understood that present principles can be extended to various languages and platforms and helps reduce the computational complexity and improve detection accuracy.

Now describing in detail pronunciation pruning as referenced herein, there may be at least three types of pruning. Optionally, the three types described below may be specifically performed in the order they are set forth below. But first, it is to be understood that one of the reasons for pronunciation augmentation is to cover the reasonable variances for the same keyword since the same keyword, during the detection phase, might "sound" slightly different compared with its pronunciation in registration due to a speaker's physical condition (e.g., sore throat), channel difference, the user simply speaking the keyword slightly different than during registration, etc. It is to be further understood that one of the reasons for pronunciation pruning is to preserve the "good" augmented pronunciations to improve detection accuracy and remove the "bad" augmented pronunciations to reduce false alarms/false activation of the assistant system.

As for two of the three types of pruning mentioned above, they may be considered rule-based pronunciation pruning, which collectively may be considered one "part" of pruning. In any case, the first type of pruning falling under rule-based pronunciation pruning eliminates augmented pronunciations that are shorter than the required or minimum phoneme length. The second type of pruning falling under rule-based pronunciation pruning eliminates augmented pronunciations that are not similar enough when compared with the original decoded pronunciation P$_r$ from which the various augmented pronunciations P$_a$ are derived.

The first type of pruning simply involves identifying augmented pronunciations that are shorter than the required or minimum threshold phoneme length (e.g., as set by the system's developer). They may then be eliminated and hence not added to the keyword dictionary. Thus, with this type of pruning augmented pronunciations that are too short may be filtered out.

The second type of pruning involves measuring the similarity between P$_r$ and a P$_a$. A fused distance metric may be used that is based on a Jaro Winkler normalized distance and based on a Demerau Levenshtein normalized distance that are averaged. The fused distance metric equation may be $$d = \frac{\alpha * dl + (1 - \alpha) * jw}{2},$$

where α is a weighting parameter, where dl is the Demerau Levenshtein normalized distance, and where jw is the Jaro Winkler normalized distance. Thus, with this type of pruning augmented pronunciations that are too "far away" (not similar enough) from the original decoded pronunciation may be filtered out if the resulting fused distance is more than a threshold distance (e.g., determined by the system developer).

The third type of pruning may be considered sample-based pronunciation pruning. Here, pronunciation pruning may be based on using positive and negative samples to go "deeper" than rule-based pruning. It involves the preparation of positive data sample sets (based on the keyword itself) and negative data sample sets (non-keyword) for obtaining sample matching scores associated with matched pronunciations.

The positive samples may be established by the keyword recordings (e.g., wave files) that the user recorded during the first part of the registration phase and that were decoded using a phoneme recognizer model, while the negative samples may be selected from a subset of a word database collected offline and determined by the system's developer. Optionally, these negative samples may sound different enough compared with the keyword so that they are not treated as positive samples, but still not too different with the keyword so that they are in the neighborhood of the keyword in the pronunciation space and tend to cause confusion. The negative set can be extracted by a pronunciation distance measurement.

Sample matching may thus be understood as a process to obtain the most similar pronunciation $P_a^*$ with the decoded pronunciation of the sample $P_0$. The similarity/distance measurement may be $Dist(P_a^*, P_0)=\min (P_a, P_0)$, where $P_a$ may be the various augmented pronunciations from $P_0$.

Figure 10:
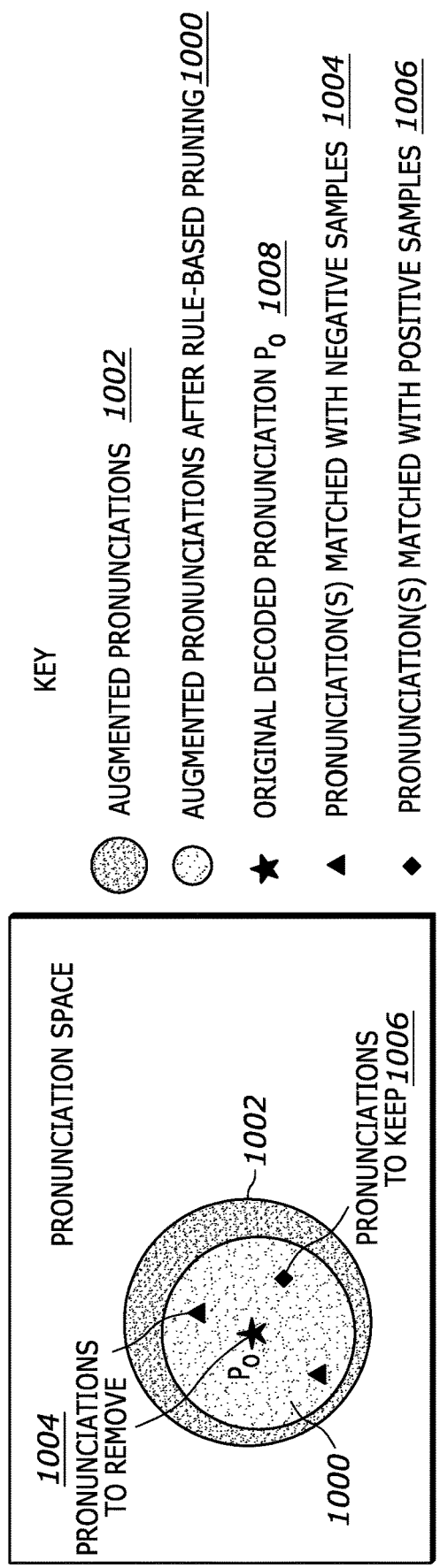
FIG. 10 illustrates sample matching during pronunciation pruning in accordance with present principles.

The process of pronunciation pruning based on positive/negative sample decoding is illustrated in FIG. 10. As shown, if an augmented pronunciation after rule-based pruning 1000 (designated by the circle with the smaller radius) is matched with a negative sample 1004 owing to it being most similar to the decoded pronunciation of one or more negative samples, that pronunciation may be marked for deletion and ultimately deleted. If a augmented pronunciation 1000 is matched with a positive sample 1006 owing to it being most similar to the decoded pronunciation of one or more positive samples, that pronunciation may be kept and ultimately added to the keyword dictionary. Also, for clarity note that the augmented pronunciations before rule-based pruning 1002 are designated by the circle with the larger radius as illustrated in FIG. 10, and that the original decoded pronunciation $P_0$ 1008 is shown generally at the center of these overlapping circles 1000, 1002.

However, also note that in some scenarios, the same augmented pronunciation may be matched with multiple samples, some of which may be positive samples and some of which may be negative samples. In such an instance, a weighted average score of matched samples for the same augmented pronunciation may be used and the augmented pronunciation may be kept if the weighted average of matched positive/negative samples is greater than a weighted average threshold.

For example, if the match is with a negative sample then the weight may be negative and if the match is with a positive sample then the weight may be positive, but whether the sample weight is positive or negative may be intentionally ignored when using a distance metric for determining the distance. The distance may then be used to determine the weight magnitude and, for example, the smaller the distance, the greater the weight, and vice versa. Thus, it may be appreciated that if a match occurs with a negative sample with a sufficiently close distance, then the result may be a relatively large "negative" weight but the augmented pronunciation may still be kept if the weighted average is still greater than the threshold.

Keyword adaptation will now be described, where the system embodying the assistant may be adapted to the user providing the utterances of a desired keyword during the registration phase to make the system more familiar with the user's voice. Specifically, keyword adaptation may be performed to train a generic phoneme recognizer model (that might initially be used during the registration phase) using connectionist temporal classification (CTC)-based warping and the user's newly-registered keyword recordings as training data to adapt the phoneme recognizer model specifically to the user's speech to further improve accurate keyword spotting/decoding and hence the user's experience and interaction with the assistant/system.

Figure 11:
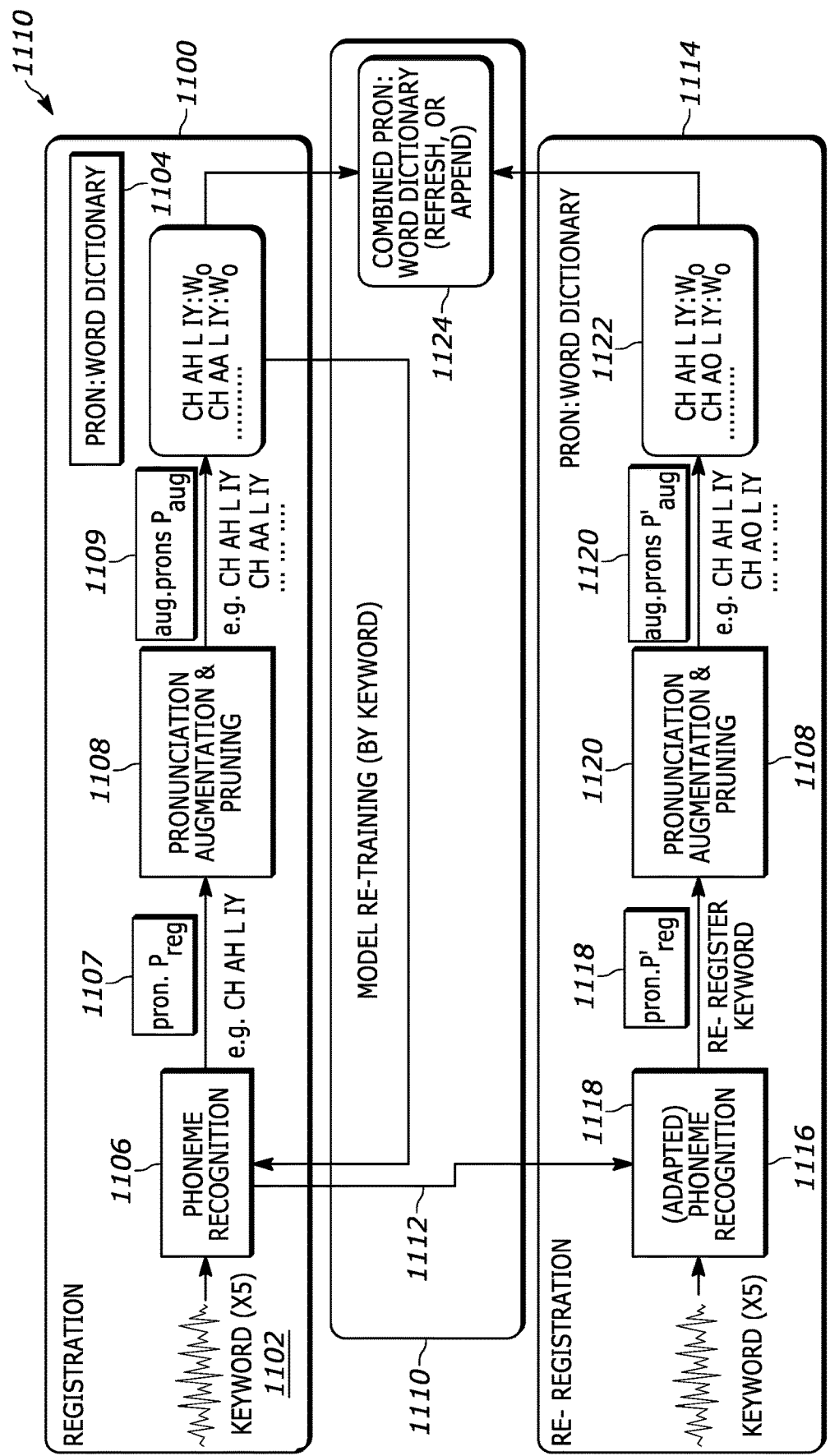
FIG. 11 shows an example flowchart of keyword adaptation of a phoneme recognizer model in accordance with present principles.

FIG. 11 shows a process of keyword adaptation during the registration phase in accordance with present principles. In non-limiting embodiments, keyword adaptation may involve five steps. First, "regular" registration 1100 from input keyword recordings 1102 to pronunciation dictionary 1104 may be performed as described above, as if without keyword adaptation. This may involve use of an original or generic phoneme recognizer model 1106 to render a pronunciation output 1107 designated as $P_{reg}$ (e.g., "CH AH L IY"). The output 1107 may then be provided as input to a pronunciation augmentation and pruning model 1108 to render an augmented set 1109 of pronunciation outputs $P_{aug}$ that may be greater than one. Then both the pronunciation output 1107 and augmented set 1109 may then be entered into a dictionary 1104.

Second, the phoneme recognizer model may be retrained/adapted during a training/re-training phase 1110 with keyword-pronunciation pairs as training samples. Further, it is to be understood that some recordings may have multiple pronunciations associated with them after pronunciation augmentation and pruning 1108, in which case the recordings may be duplicated/re-used to create distinct recording-pronunciation pairs for each pronunciation after pronunciation augmentation and pruning.

Third, the original phoneme recognizer model 1106 may be replaced with an keyword-adapted phoneme recognizer model 1116 after training/re-training, as generally shown by arrow 1112.

Fourth, the keyword pronunciations may be re-registered during a re-registration phase 1114 in that the system may go through the same registration phase including phoneme recognition 1118 as well as pronunciation augmentation and pronunciation pruning 1120 but using the updated, keyword-adapted phoneme recognizer 1116.

Fifth, the keyword pronunciation dictionary 1104 may be updated as designated by box 1124 in that the previous pronunciation dictionary 1104 that was augmented can be replaced with a new pronunciation dictionary 1122 generated based on step four in the paragraph above. The previous pronunciation dictionary 1104 may then be deleted, or it may be kept as a backup in history/storage accessible to the system should the new pronunciation dictionary 1122 ultimately prove not as useful (e.g., if it was generated based on audio samples of the user while the user had a sore throat or other malady affecting speech) so that it may again be used at a later time. However, in other examples the new dictionary 1122 (or at least the new entries for the dictionary 1122) may be appended to the previous keyword pronunciation dictionary 1104 that was augmented prior to keyword adaptation.

Furthermore, it is to be understood that in some examples, the steps above may be repeated for keyword adaptation in examples where one or more users might assign plural keywords/names to a single assistant/system. Thus, keyword adaptation according to the steps above may be performed using recordings for one of the keywords assigned to the assistant (recordings from the same person, and/or different people), and then the modified model may be modified again using recordings for a different one of the keywords assigned to the assistant. Adaptation according to these steps may continue to occur for each set of recordings corresponding to a different keyword assigned to the assistant, and even for a same keyword if the user engages in intermittent registration as set forth above to provide a set of new recordings of a keyword the user already provided at an earlier time. This may help the system recognize any person speaking any registered keyword for the assistant/system.

Figure 12:
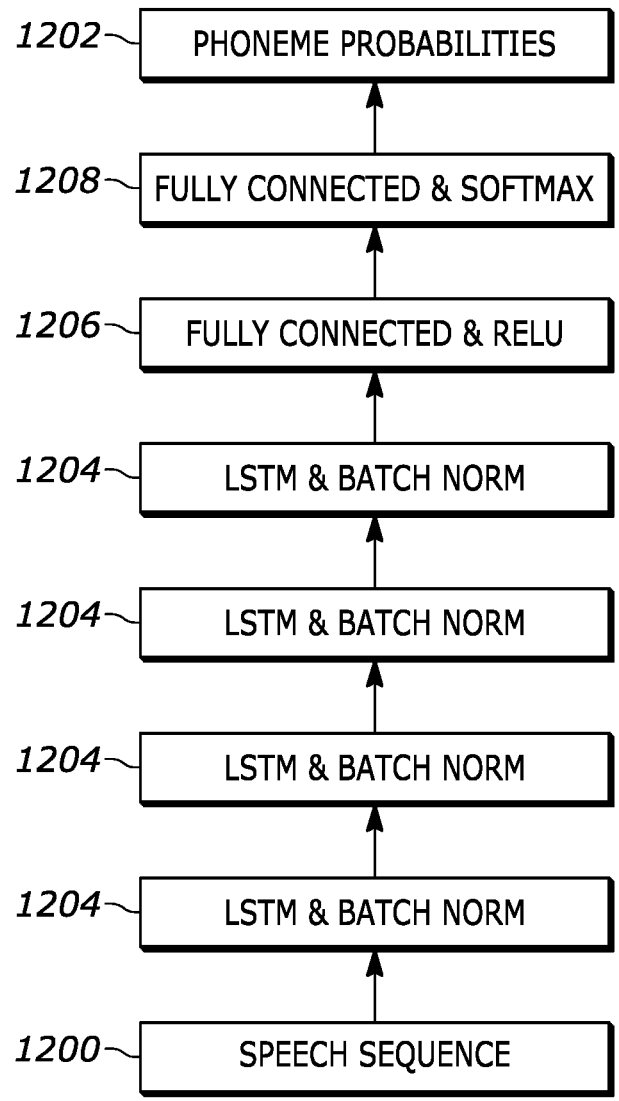
FIG. 12 shows example architecture of a phoneme recognizer model in accordance with present principles.

FIG. 12 shows example phoneme recognizer model architecture established by a recurrent neural network (RNN) operating in accordance with present principles to receive a speech sequence 1200 as input and output one or more phoneme probabilities 1202 as output. As shown, the input 1200 may be passed into an input layer and then through multiple long short-term memory ("LSTM") and batch normalization ("batch norm") hidden layers 1204, as well as one or more fully connected and rectified linear unit (ReLU) layers 1206 and one or more fully connected and softmax function layers 1208, ultimately providing the output 1202 through an output layer.

Moving on from FIG. 12, it is to be understood that another feature may also be used in accordance with present principles. Specifically, pre-registered keyword spotting for words that might accompany or surround the user-designated and potentially unique keyword may also be used during the decoding phase. A separate dictionary of context-relevant pre-registered keywords may be used for such purposes to further enhance the system's ability to distinguish between a user actually attempting to trigger the system to wake up and false positives where the user did not intend to do so. So, for example, if the system identifies within a certain probability that the user's unique keyword has been provided but that probability does not reach a probability threshold for waking up/activating the assistant based on the unique keyword alone, the system may consider surrounding, pre-registered key words to determine if they contain a request for information or a command or other item actionable by the system, or rather if they simply contain speech not meant to be input to the system. For example, "Tom, turn on the TV" may be an example of the former (with "Tom" being the user's desired wake up keyword), while "Tom, my favorite color is green" may be an example of the latter. The first phrase may thus trigger system wake-up/activation, while the second phrase may not.

Figure 13:
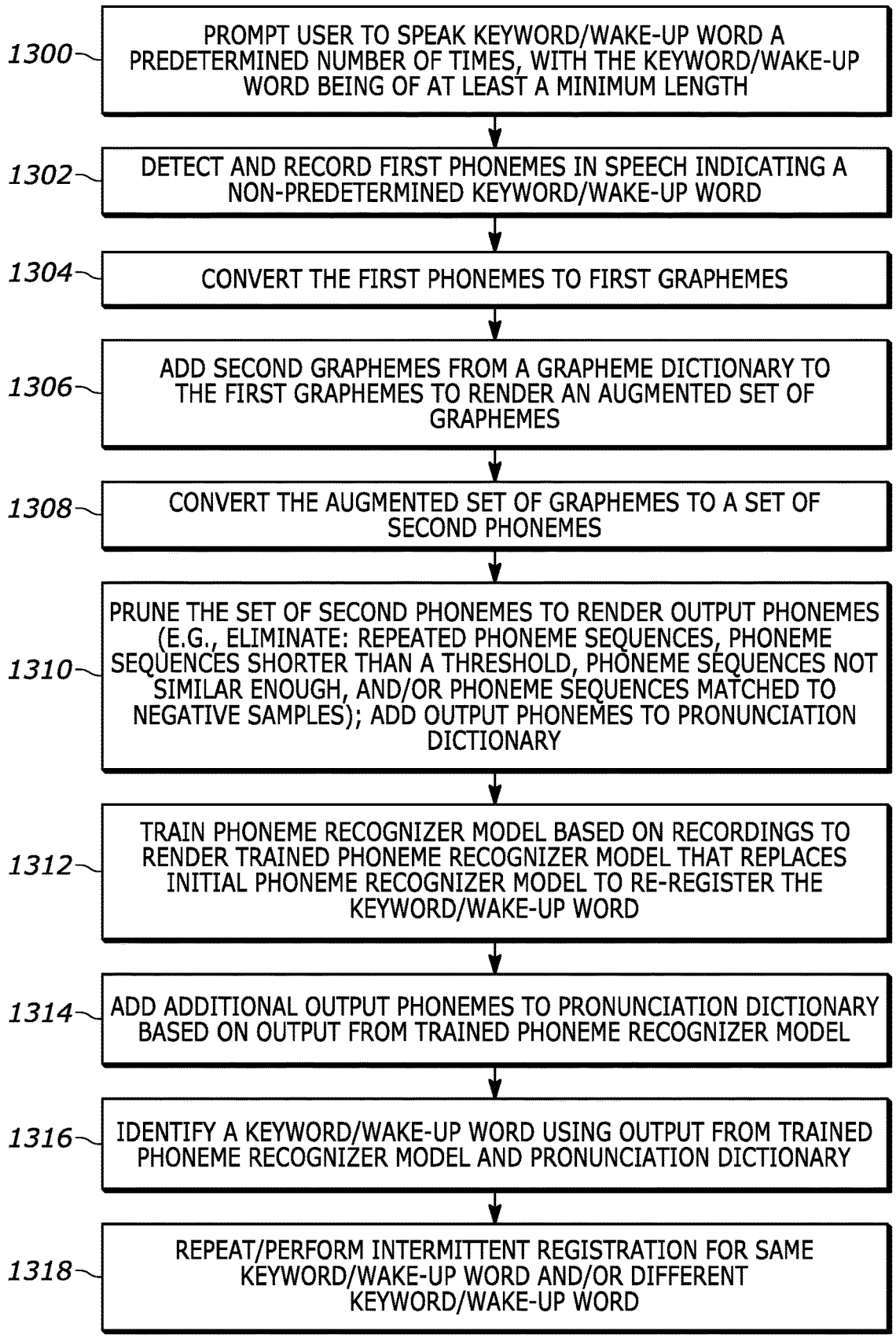
FIG. 13 shows a flow chart of example overall logic in accordance with present principles.
Figure 14:
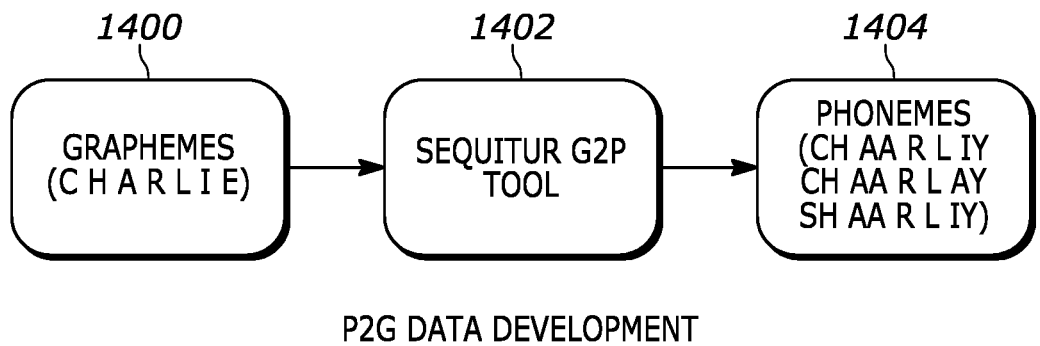
FIG. 14 shows an example flowchart for using a sequitur tool to generate phonemic variations of a grapheme sequence in accordance with present principles.
Figure 15:
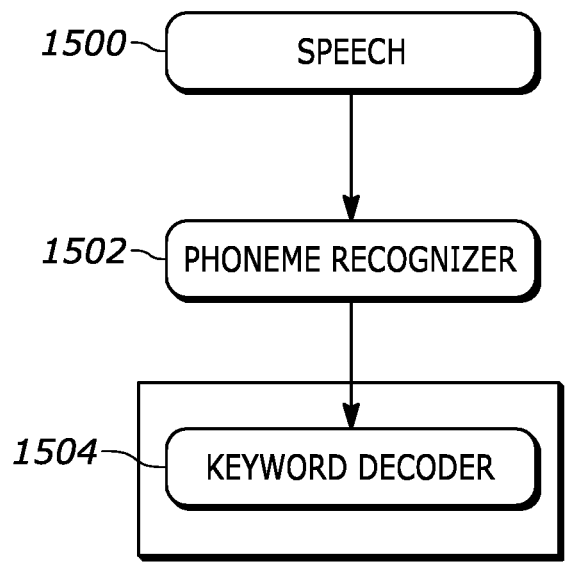
FIG. 15 is an example overview flowchart indicating items used for decoding a keyword in accordance with present principles.

Now describing FIG. 13, it shows a flow chart of example overall logic executable by a digital assistant system in accordance with the principles set forth herein. Beginning at block 1300, the system may prompt a user to speak a desired keyword/wake-up word a predetermined number of times, and may even prompt that the keyword should be at least of a minimum length. Then at block 1302 the device may detect and record first phonemes in the user's speech indicating the user's non-predetermined keyword. Thereafter, at block 1304 the system may convert the first phonemes to first graphemes and then at block 1306 add second graphemes from a grapheme dictionary using the first graphemes to render an augmented set of graphemes.

From block 1306 the logic may then proceed to block 1308 where the system may convert the augmented set of graphemes to a set of second phonemes. Thereafter, at block 1310 the system may prune the set of second phonemes to render output phonemes by eliminating, e.g., repeated phoneme sequences, phoneme sequences shorter than a threshold, phoneme sequences that are not similar enough, and/or phoneme sequences that have been matched to negative samples. Also at block 1310, the output phonemes may be added to a pronunciation dictionary.

From block 1310 the logic may then proceed to block 1312 where the system may train the phoneme recognizer model (that was used to detect the phonemes at block 1302) using connectionist temporal classification (CTC)-based warping based on the recordings (also from block 1302) to render a trained phoneme recognizer model that may replace the initial phoneme recognizer model (used at block 1302) to re-register the user's keyword. The logic may then move to block 1314 where the system may add additional output phonemes to the pronunciation dictionary based on outputs from the trained phoneme recognizer model during re-registration.

From block 1314 the logic may proceed to block 1316 where, during a detection phase, the system may identify the keyword being spoken by the user or another person using output from the trained phoneme recognizer model and using the pronunciation dictionary with added pronunciations. Then, if desired, the logic may move to block 1318 where the system may repeat steps 1300-1314 for a different keyword or the same keywords, e.g., during an intermittent registration.

It will be appreciated that whilst present principals have been described with reference to some example embodiments, these are not intended to be limiting, and that various alternative arrangements may be used to implement the subject matter claimed herein.

What is claimed is:

1. A method for identifying a keyword in speech, comprising:
   detecting first phonemes in the speech;
   converting the first phonemes to first graphemes;
   adding second graphemes from a dictionary to the first graphemes to render an augmented set of graphemes;
   converting the augmented set of graphemes to a set of second phonemes;
   pruning the set of second phonemes to render output phonemes; and
   identifying the keyword based at least in part on the output phonemes.

2. The method of claim 1, comprising executing the method using at least one neural network adapted to a human generating the speech.

3. The method of claim 1, wherein the dictionary comprises base words, each base word being correlated to "K" phoneme mappings, translated words, each translated word being correlated to "N" phoneme mapping; and each base word being correlated to "M" translated words, wherein "K", "N", and "M" are integers and at least "K" is greater than one.

4. The method of claim 1, wherein the keyword in the speech is indicated by a user, the keyword not being pre-determined before being indicated in the speech.

5. The method of claim 1, comprising:
   indicating to a user to speak the keyword a predetermined number of times greater than one and indicating to the user that the keyword should contain at least three phonemes.

6. The method of claim 1, wherein pruning the set of second phonemes comprises removing repeated phoneme sequences from the set of second phonemes.

7. The method of claim 1, wherein pruning the set of second phonemes comprises eliminating phoneme sequences from the set of second phonemes if a particular phoneme sequence is shorter than a threshold sequence length.

8. The method of claim 1, wherein pruning the set of second phonemes comprises eliminating phoneme sequences from the set of second phonemes if a first phoneme sequence in the set of second phonemes is not similar to a second phoneme sequence established by the first phonemes.

9. The method of claim 8, wherein similarity is measured using a fused distance metric based on a Jaro Winkler normalized distance and based on a Demerau Levenshtein normalized distance.

10. The method of claim 9, wherein the fused distance metric is determined using the equation $$d = \frac{\alpha * dl + (1-\alpha) * jw}{2},$$

wherein α is a weighting parameter, wherein dl is the Demerau Levenshtein normalized distance, and wherein jw is the Jaro Winkler normalized distance.

11. The method of claim 1, wherein pruning the set of second phonemes comprises pruning based on sample matching of positive and negative samples, wherein phoneme sequences from the set of second phonemes are eliminated if matched only to a negative sample.

12. The method of claim 11, wherein phoneme sequences from the set of second phonemes that are matched to positive and negative samples are not eliminated from the set of second phonemes if a weighted average of matched samples is greater than a threshold.

13. The method of claim 1, wherein the detecting is performed using a phoneme recognizer model, and wherein the method comprises:
training, subsequent to the pruning, the phoneme recognizer model based on one or more recordings indicating the first phonemes.

14. The method of claim 13, wherein the output phonemes are first output phonemes, wherein the phoneme recognizer model is a first phoneme recognizer model, wherein the training renders a second phoneme recognizer model from the first phoneme recognizer model, and wherein the method comprises:
using, subsequent to the training, the second phoneme recognizer model to render second output phonemes; and
either adding the second output phonemes to the first output phonemes for attempts to identify the keyword based on both the first and second output phonemes, or replacing the first output phonemes with the second output phonemes for attempts to identify the keyword based on the second output phonemes but not the first output phonemes.

15. A computer-implemented method for identifying a keyword in speech, comprising:
detecting a first phoneme sequence in the speech based on the keyword being spoken in a first instance;
using the first phoneme sequence to identify a first grapheme sequence;
identifying at least second and third grapheme sequences from a dictionary based on the first grapheme sequence;
converting the second grapheme sequence to at least second and third phoneme sequences and converting the third grapheme sequence to at least fourth and fifth phoneme sequences; and
using at least one of the second, third, fourth, and fifth phoneme sequences to identify the keyword being spoken again in a second instance, the second instance occurring subsequent to the first instance.

16. The method of claim 15, further comprising:
eliminating the second phoneme sequence; and
identifying the keyword being spoken again in the second instance using at least one of the third, fourth, and fifth phoneme sequences but not using the second phoneme sequence.

17. The method of claim 15, wherein the first phoneme sequence is detected using a first phoneme recognizer model, wherein the first phoneme sequence in the speech is stored as one or more recordings, and wherein the method comprises:
using the one or more recordings to adapt the first phoneme recognizer model to a person that provided the speech.

18. The method of claim 17, wherein the one or more recordings are used to adapt the first phoneme recognizer model to the person to render a second phoneme recognizer model, the second phoneme recognizer model being used to identify the keyword being spoken in the second instance.

19. A device comprising:
at least one computer storage that is not a transitory signal and that comprises instructions executable by at least one processor for:
detecting first phonemes in the speech;
converting the first phonemes to first graphemes;
adding second graphemes from a dictionary to the first graphemes to render an augmented set of graphemes;
converting the augmented set of graphemes to a set of second phonemes;
pruning the set of second phonemes to render output phonemes; and
identifying the keyword based at least in part on the output phonemes.

20. The device of claim 19, comprising the at least one processor executing the instructions.

* * * * *

UNITED STATES PATENT AND TRADEMARK OFFICE
CERTIFICATE OF CORRECTION

| | |
|---|---|
| PATENT NO. | : 11,217,245 B2 |
| APPLICATION NO. | : 16/555616 |
| DATED | : January 4, 2022 |
| INVENTOR(S) | : Lakshmish Kaushik and Zhenhao Ge |

It is certified that error appears in the above-identified patent and that said Letters Patent is hereby corrected as shown below:

On the Title Page

Item (72) add:
Xiaoyu Liu
5771 Silhouette Ct, Dublin, California, 94568, United States (US)

Signed and Sealed this
Ninth Day of July, 2024

Katherine Kelly Vidal
*Director of the United States Patent and Trademark Office*